W. CUPPER.
FASTENING DEVICE.
APPLICATION FILED DEC. 23, 1912.

1,071,986. Patented Sept. 2, 1913.

Witnesses:
A. H. McGlinchey.
L. B. Weymouth.

Inventor:
William Cupper.
by Samuel B. Forks.
Atty.

UNITED STATES PATENT OFFICE.

WILLIAM CUPPER, OF MALDEN, MASSACHUSETTS.

FASTENING DEVICE.

1,071,986.

Specification of Letters Patent.  Patented Sept. 2, 1913.

Application filed December 23, 1912. Serial No. 738,261.

*To all whom it may concern:*

Be it known that I, WILLIAM CUPPER, a citizen of the United States, residing at Malden, in the county of Middlesex and State of Massachusetts, have invented a new and useful Improvement in Fastening Devices, of which the following is a specification.

The object of this invention is to provide a means for securely fastening windows, doors and other like devices which cannot be operated or unlocked from the outside and which will so tightly fasten them that, as in the case of windows, they will not be rattled by the wind. I attain these objects by the use of the mechanism illustrated in the accompanying drawing, in which—

Figure 1:
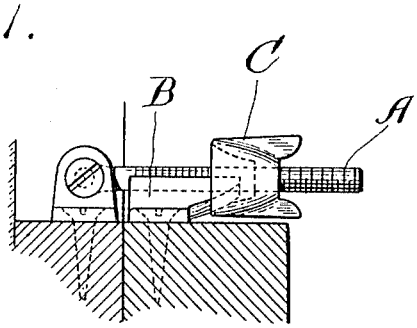
Figure 2:
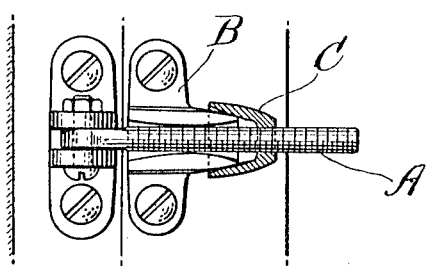

Figure 1 is an elevation view of the fastener in locked position; Fig. 2, a top view of the fastening device also in locked position and Fig. 3, a vertical section of the device in unlocked position.

Similar letters refer to similar parts throughout the several views.

The three essential features of the invention, as shown in the drawing, are a threaded rod, A, which is shown as attached to the lower portion of an upper window-sash and is free to move in the direction required; a support, B, fastened to the upper portion of a lower window-sash, and a nut, C, designed to screw onto the threaded rod, A. The support, B, is slotted to receive the threaded rod, A, and is also tapered at one end, as shown, to permit the nut, C, when screwed upon rod, A, to slide over the end of support, B.

The nut, C, is drilled out from one end to fit over the taper on one end of support, B, so that when screwed on rod, A, as it lies in slot of support, B, it will slide over the tapered end of said support, B.

Figure 3:
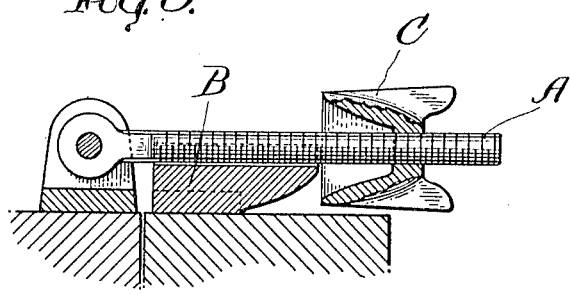

Figs. 1 and 2, which show respectively an elevation and a plan view of the fastener in its locked position and Fig. 3, which shows a vertical sectional view of the fastener in its unlocked position, illustrate clearly the objects of the invention.

In locking the window, the threaded rod, A, which may be thrown back out of the way when it is desired to raise the lower window-sash or lower the upper sash, is dropped forward so as to rest in the slot of support, B, and the nut, C, being then screwed onto rod, A, slides over the tapered end of support, B, as in Figs. 1 and 2, thus making it impossible to raise this threaded rod out of the slot in support, B, until the nut, C, is unscrewed, or "backed off," far enough to completely clear support, B, as in Fig. 3.

In screwing on nut, C, as it slides over the tapered end of support, B, it not only locks rod, A, into slot of support, B, thus preventing the raising or lowering of the window-sashes but so rigidly binds the sashes together that neither sash can be moved in the window-frame thus preventing all rattling of the sashes.

In my invention, herein described, the nut, C, sliding onto the tapered end of support, B, draws the sashes together so tightly that they cannot rattle in their frames and also tends to force the sashes up and down, respectively, into their proper positions it being possible to screw up nut, C, until the sashes are rigidly locked without regard to how much the sashes have shrunk or warped.

The sashes can be so tightly drawn together that it is not possible to insert between them a tool that could be utilized to unlock the fastener from the outside. In fact, if the nut, C, be screwed up tight, if any sort of tool could be inserted between the sashes or between a sash and the window-frame it would be impossible to so manipulate it from the outside as to unscrew the nut, C.

The different uses to which the fastener embodied in my invention can be put are very numerous and will be apparent from the foregoing description and drawing and while the drawing represents a preferred form of the invention,

What I claim as new and desire to secure by Letters Patent, is:

1. A threaded rod pivotally supported, or hinged, at one end, a support therefor tapered at one end and slotted to receive said rod, a nut adapted to screw onto said rod and drilled out from one end so as to slide over the tapered end of said support whereby, when said nut is screwed onto the threaded rod as it lies in the slot of said support it locks said rod into said slot.

2. A threaded rod pivotally attached, or hinged, at one end to the sash of a window, a support tapered at one end, slotted to receive said rod and attached to the other sash of the window, a nut adapted to screw onto said rod and drilled out from one end so as to slide onto the tapered end of said support whereby when screwed onto said rod as it lies in the slot of said support it not only locks said rod into the slot but draws the window-sashes together to prevent their moving in their frames.

WILLIAM CUPPER.

Witnesses:
WILLIAM J. GEEGAN,
CATHERINE A. CODY.